US012808403B2

(12) United States Patent
Mouillon et al.

(10) Patent No.: US 12,808,403 B2
(45) Date of Patent: Nov. 24, 2026

(54) FASTENING DEVICE

(71) Applicant: A. RAYMOND ET CIE, Grenoble (FR)

(72) Inventors: Romain Mouillon, Voreppe (FR); Jean-Francois Albaran, Varces Allières Et Risset (FR)

(73) Assignee: A. RAYMOND ET CIE, Grenoble (FR)

( * ) Notice: Subject to any disclaimer, the term of this patent is extended or adjusted under 35 U.S.C. 154(b) by 337 days.

(21) Appl. No.: 18/698,656

(22) PCT Filed: Oct. 10, 2022

(86) PCT No.: PCT/FR2022/051906
§ 371 (c)(1),
(2) Date: Apr. 4, 2024

(87) PCT Pub. No.: WO2023/062311
PCT Pub. Date: Apr. 20, 2023

(65) Prior Publication Data

US 2025/0237259 A1 Jul. 24, 2025

(30) Foreign Application Priority Data

Oct. 15, 2021 (FR) ...................................... 2110980

(51) Int. Cl.
*F16B 37/04* (2006.01)
*F16B 33/00* (2006.01)
*F16B 37/00* (2006.01)

(52) U.S. Cl.
CPC .......... *F16B 37/043* (2013.01); *F16B 33/006* (2013.01); *F16B 37/005* (2013.01)

(58) Field of Classification Search
CPC .... F16B 37/043; F16B 33/006; F16B 37/005; F16B 19/02; F16B 5/0208
See application file for complete search history.

(56) References Cited

U.S. PATENT DOCUMENTS

| | | | | |
|---|---|---|---|---|
| 5,593,262 A * | 1/1997 | Gedeon | ................ | F16B 37/043 411/182 |
| 8,348,569 B2 * | 1/2013 | Tournier | ............... | F16B 37/044 411/522 |

(Continued)

FOREIGN PATENT DOCUMENTS

| | | |
|---|---|---|
| FR | 2857761 | 1/2005 |

OTHER PUBLICATIONS

International Search Report for application No. PCT/FR2022/051906 dated Feb. 6, 2023.

*Primary Examiner* — Amy J. Sterling
(74) *Attorney, Agent, or Firm* — Perman & Green, LLP

(57) ABSTRACT

A pre-holding clip which is in the form of a sleeve, including a substantially cylindrical tubular body having an opening along its axis. The clip includes at least one spring element over the external surface of the body, the spring element projecting out of the external surface of the body and being able to be deformed towards the axis of the body; and the clip further includes at least one protrusion over the internal surface of the body, the at least one protrusion could be threaded when a tapped rod with an external diameter of the tapping larger than the internal diameter of the opening is introduced by screwing into the opening.

13 Claims, 2 Drawing Sheets

(56) References Cited

U.S. PATENT DOCUMENTS

| | | | | |
|---|---|---|---|---|
| 10,465,734 | B2 * | 11/2019 | McClure | F16B 37/043 |
| 2003/0143054 | A1 * | 7/2003 | Kanie | F16B 5/065 411/175 |
| 2009/0317207 | A1 | 12/2009 | Hartmann | |
| 2015/0107060 | A1 * | 4/2015 | Ortega Dona | F16B 37/043 24/295 |
| 2015/0152902 | A1 | 6/2015 | Bachman et al. | |
| 2021/0180640 | A1 | 6/2021 | Fleckenstein et al. | |

* cited by examiner

[Fig. 1]
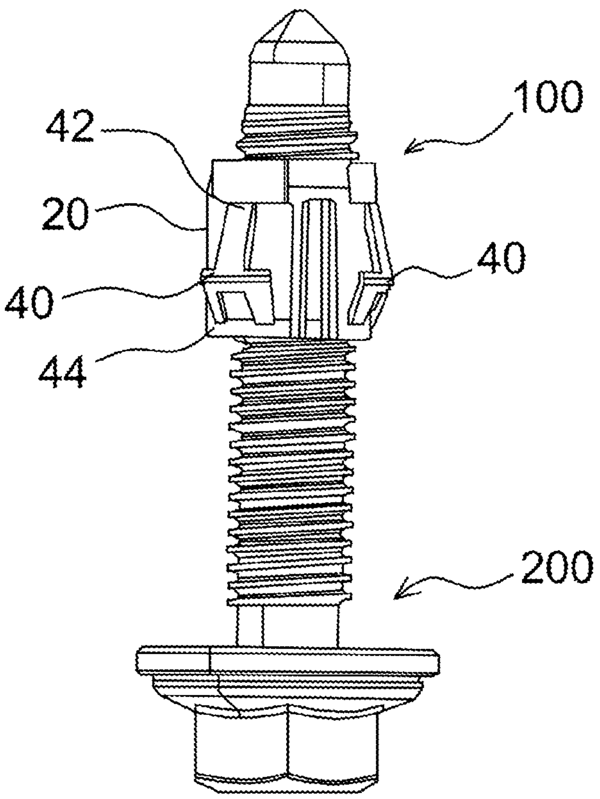
[Fig. 2]
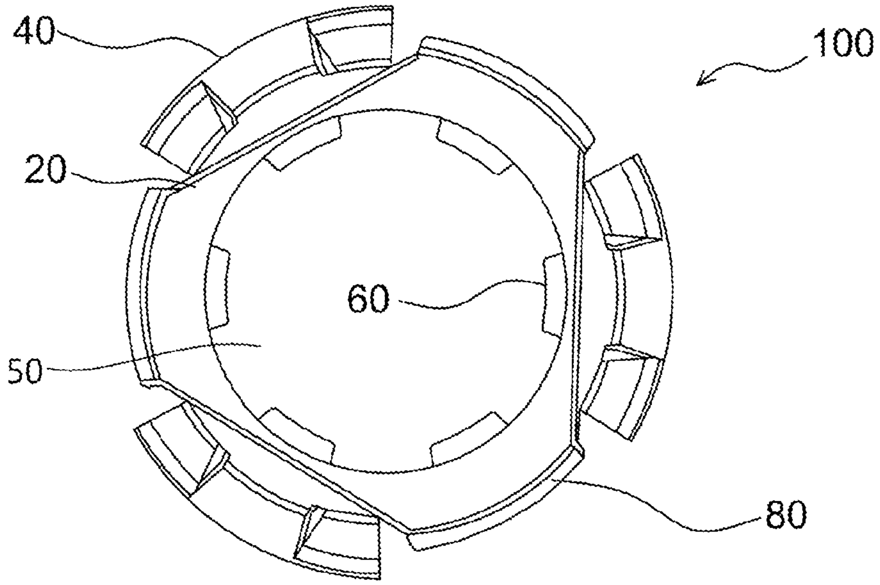

[Fig. 3]
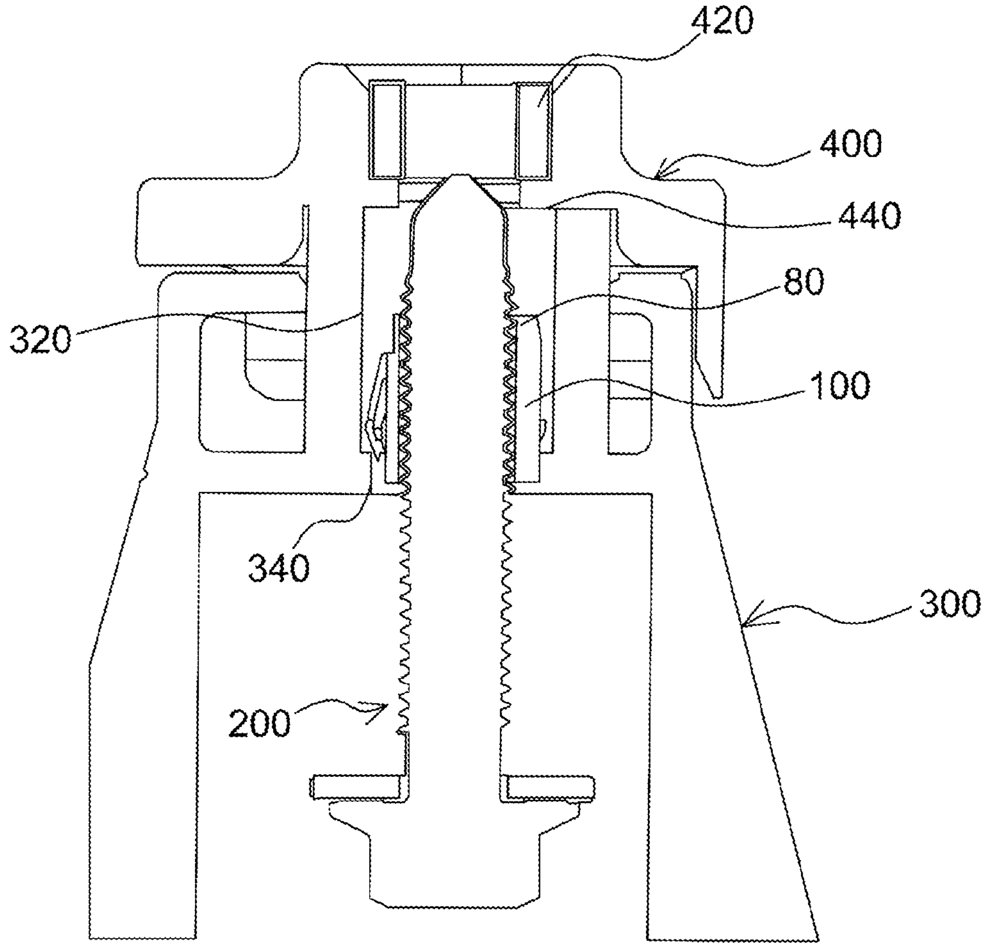
[Fig. 4]
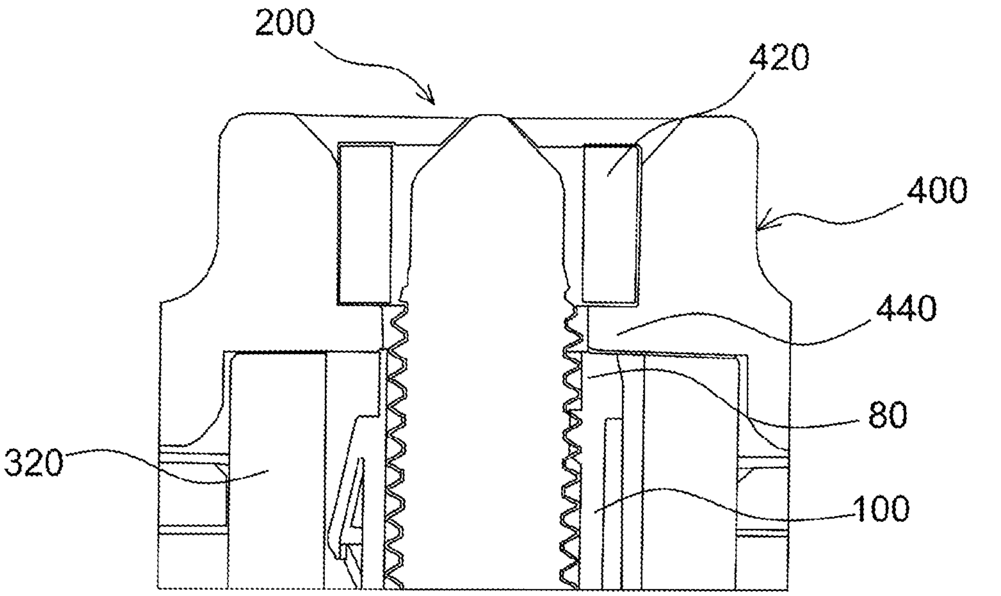

FASTENING DEVICE

CROSS REFERENCE TO RELATED APPLICATIONS

This application is a National Stage of International Application No. PCT/FR2022/051906, having an International Filing Date of 10 Oct. 2022, which designated the United States of America, and which International Application was published under PCT Article 21(2) as WO Publication No. 2023/062311 A1, which claims priority from and the benefit of French Patent Application No. 2110980 filed on 15 Oct. 2021, the disclosures of which are incorporated herein by reference in their entireties.

BACKGROUND

Field

The present disclosure relates to a fastening device, in particular a plastic pre-holding device for holding a screw on a part to be fastened. The present disclosure also relates to a fastening element including such a plastic pre-holding device and a screw. For example, traction batteries could be fastened to the structure of an electric vehicle by means of the fastening elements. The present disclosure also relates to a pre-mounted set which includes the fastening element according to the disclosure and a structure such as a battery container.

Brief Description of Related Developments

In particular, in the field of mounting traction batteries on a vehicle structure, automatons are used to perform the step of screwing on the screws which are pre-held in the spacer carrying the battery container. It is quite preferable that holding of the screw in position during the advance of the assembly line is ensured up to the screwing station. The screw is often held in the spacer by a staple. A staple allowing pre-holding a screw in a structure is known from the prior art.

The patent document US20090317207A1 describes a connection set including a screw and a bushing having a spring element. The tapped portion of the screw is engaged with one end of the spring element when the latter is deformed by a hole that receives this connecting element.

This device does not provide for any engagement between the screw and the sleeve in a position not pre-mounted in the hole. Another problem is that mounting and/or dismounting with such a connection set requires complex manoeuvres.

SUMMARY

The present disclosure aims to overcome these drawbacks, by providing a fastening device which allows fastening a battery container to a structure while guaranteeing positioning of the fastening device during the advance of the assembly line.

To this end, the present disclosure relates to a pre-holding clip for holding a screw on a part to be fastened. The present disclosure also relates to a fastening element including the pre-holding clip and a pre-mounted set which includes a pre-holding clip according to the present disclosure.

The pre-holding clip, which is in the form of a sleeve, includes a substantially cylindrical tubular body having an opening along its axis.

According to an aspect of the disclosure, the pre-holding clip has the following features:

- the clip includes at least one spring element over the external surface of the body, the spring element projects out of the external surface of the body and is able to be deformed towards the axis of the body; and
- the clip further includes at least one protrusion over the internal surface of the body, said at least one protrusion could be threaded when a tapped rod with an external diameter of the tapping larger than the internal diameter of the opening is introduced by screwing into the opening.

Advantageously, the clip is secured to the screw by screwing.

Advantageously, the clip receiving a tapped screw in vertical position could hang from or be held in a spacer of a structure. The spring element enables a raised holding of the clip and of the screw, in particular opposite the weight of the screw.

Advantageously, the screw holds position during the advance of the assembly line up to the screwing station.

According to one aspect, the pre-holding clip includes three spring elements distributed at an equal distance over the external surface of the body.

According to one aspect, said at least one spring element is a V-like shaped leaf spring, the two ends of the spring element being secured to the body.

Advantageously, the V-like shaped leaf spring is deformable for the introduction and also enables dismounting.

According to one aspect, the pre-holding clip includes a plurality of protrusions over the internal surface of the body.

According to a second aspect of the disclosure, the fastening element includes

- a screw including a head and a tapped rod with a tapping; and
- a pre-holding clip, in the form of a sleeve, including a substantially cylindrical tubular body having an opening along its axis,
- the clip includes at least one spring element over the external surface of the body, the spring element projecting out of the external surface of the body and being able to be deformed towards the axis of the body; and
- the clip further includes at least one protrusion over the internal surface of the body, said at least one protrusion could be threaded when the tapped rod with an external diameter of the tapping larger than the internal diameter of the opening is introduced by screwing into the opening.

According to one aspect, the pre-holding clip includes three spring elements distributed at an equal distance over the external surface of the body.

According to one aspect, said at least one spring element is a V-like shaped leaf spring, the two ends of the spring element being secured to the body.

In one aspect, the clip includes a plurality of protrusions over the internal surface of the body.

According to a second aspect of the disclosure, the pre-mounted set, includes

- a part including a hole, the internal diameter of the hole in a first end being smaller than the general internal diameter of the hole,
- a screw including a head and a tapped rod with a tapping; and
- a pre-holding clip, in the form of a sleeve, including a substantially cylindrical tubular body having an opening along its axis,

- the clip includes at least one spring element over the external surface of the body, the spring element projecting out of the external surface of the body and being able to be deformed towards the axis of the body; and
- the clip further includes at least one protrusion over the internal surface of the body, said at least one protrusion could be threaded when the tapped rod with an external diameter of the tapping larger than the internal diameter of the opening is introduced by screwing into the opening.

In one aspect, said at least one spring element is deformed towards the axis of the body when the pre-holding clip with the screw introduced is mounted into the hole by the first end.

In one aspect, the clip includes three spring elements distributed at an equal distance over the external surface of the body.

According to one aspect, said at least one spring element is a V-like shaped leaf spring, the two ends of the spring element being secured to the body.

According to one aspect, the pre-holding clip includes a plurality of protrusions over the internal surface of the body.

In one aspect, the part includes a nut into which the screw could be fitted by its free end. When the screw is fitted into the nut, the pre-holding clip is in contact with a support other than the nut.

Advantageously, this allows countering the "lock nut" phenomenon related to the surface.

BRIEF DESCRIPTION OF THE FIGURES

Other advantages, aims and features of the present disclosure will come out from the following description made, for an explanatory and non-limiting purpose, with reference to the appended drawings, wherein:

FIG. 1 represents a perspective view of a fastening element including a pre-holding clip according to the present disclosure and a screw according to one aspect;

FIG. 2 represents a top view of a pre-holding clip according to one aspect;

FIG. 3 represents a sectional view of a pre-mounted set including a pre-holding clip according to the present disclosure and a screw and a part to be fastened having a hole, where the section is made according to the axis of the screw pre-mounted on the part;

FIG. 4 represents a partial sectional view of a pre-mounted set of FIG. 3, where the screw is fitted into a nut.

DETAILED DESCRIPTION

The different figures as well as the elements of the same figure are not necessarily represented to the same scale. In all figures, identical elements bear the same reference numeral.

The terminology used in the present description should in any case be interpreted in a limiting or restrictive manner, simply because it is used with reference to a detailed description of some aspects of the disclosure.

FIG. 1 shows a perspective view of a fastening element including a pre-holding clip according to the present disclosure and a screw according to one aspect.

The pre-holding clip 100 is in the form of a sleeve. The clip essentially includes a substantially cylindrical tubular body 20. The latter includes, along the axis of the body, an opening 50 which allows receiving a screw 200.

The clip 100 according to the disclosure may be manufactured by moulding a known plastic material, for example by thermoplastic injection, more particularly technical plastics such as polyamides, acetal resins, thermoplastic polyesters. Preferably, the clip 100 is made of known materials allowing resisting ageing and temperature. Advantageously, the staple 100 is manufactured by natural demoulding and/or moulding with a carriage.

The clip 100 includes at least one spring element 40 over the external surface of the body 20, preferably three spring elements 40.

The spring element 40 projects out of the external surface of the body 20. In addition, the spring element 40 is able to be deformed towards the axis of the body 20, by the action of an external force.

Advantageously, this arrangement allows having a clipping feeling for the operator when the clip is manually introduced into a spacer.

Similarly, the fact that the clip fitted into a spacer, preferably made of Aluminium, could be dismounted makes the clip 100 reusable and/or replaceable. Advantageously, the complete dismount of the clip 100 with the screw 200 in the event of a screwing defect in the assembly line allows replacing it quickly in a simple operation.

In another aspect, the clip 100 with the screw 200 is mounted in the spacer by pressure/push of the automaton.

Advantageously, the at least one spring element 40 is arranged so as to hold the clip and the received screw raised in the spacer.

In a preferred aspect, the spring element 40 is a V-like shaped leaf spring whose two ends are secured to the body 20.

A branch of the V-like shaped leaf bears against the lower contact interface of the spacer.

The clip 100 further includes at least one protrusion 60 over the internal surface of the body 20. When a screw having a tapped rod with an external diameter of the tapping larger than the internal diameter of the opening 50 is introduced by screwing into the opening 50, said at least one protrusion 60 could be threaded. Advantageously, the clip 100 is secured to the screw 200 by screwing.

Advantageously, threads of the screw 200 remain untouched by the clip after introduction thereof so as to subsequently have an excellent engagement with a nut. This will be detailed later on.

FIG. 2 shows a top view of a pre-holding clip according to one aspect.

In the illustrated aspect, the three spring elements 40 are distributed, preferably at an equal angular distance, over the external surface of the body 20.

Advantageously, this allows having a more balanced fastening.

In this aspect, the clip 100 includes, over the internal surface of the body 20, a plurality of protrusions 60 which are preferably evenly distributed.

The clip 100 includes contact areas 80 in its upper end. This is will be detailed later on in FIG. 4.

FIG. 3 illustrates a sectional view of a pre-mounted set including a pre-holding clip according to the present disclosure and a screw and a part to be fastened having a hole 320, where the section is made according to the axis of the screw pre-mounted on the structure 300 which is a spacer.

Advantageously, the hole 320 includes a reduced portion 340 serving as a stop whose internal diameter is smaller than the general internal diameter of the hole 320. Advantageously, the reduced portion 340 lies in one end of the hole 320.

A nut 420 is intended to be positioned above the hole 320 of the spacer 300 which is intended to receive the clip and the screw.

In one aspect, the nut is preferably welded or crimped on a structure 400 located above the spacer 300.

The clip 100 according to the disclosure and a screw 200 including a head and a tapped rod with a tapping forms a fastening element according to the present disclosure.

Once the screw 200 is pre-embedded in the clip 100, the next step will be to install the fastening element in a spacer 300 provided with a hole 320.

The fastening element, i.e. the clip 100 receiving a tapped screw 200, in vertical position could hang from or be held in the hole 320 of a spacer 300. The spring element enables a raised holding of the clip and of the screw 200, in particular opposite the weight of the screw 200. In fact, the lower branch of the V-like shaped leaf bears against the lower contact interface of the spacer 300 at the reduced portion 340 of the hole.

Advantageously, the screw 200 is held in position during the advance of the assembly line up to the screwing station.

In the vertical position, the present disclosure advantageously enables a movement of the pre-mounted screw 200 about its axis in the spacer 300 before screwing.

FIG. 4 illustrates a partial sectional view of a pre-mounted set of FIG. 3, where the screw 200 is fitted into the nut 420.

A pre-mounted set according to the present disclosure, includes a part 300 including a hole 320, the internal diameter of the hole 320 in a first end being smaller than the general internal diameter of the hole 300, and a fastening element including a clip and a screw. The clip 100 with the screw 200 is pre-mounted in the hole 320.

After the automaton has locked the plastic clip according to the disclosure in the spacer through a pressure/push of the automaton, this push then brings the clip with the screw on the nut 420 provided above the screw and then screwing will complete the fastening process. Thus, the clip is trapped within the spacer 300.

Advantageously, the pre-holding system, i.e., the spring elements, clears way when screwing the screw 200 into the spacer portion 300.

As explained hereinabove, the clip 100 could also be manually mounted in the spacer 300.

A support 440 is intended to lie under the screw 420. When the screw 200 is fitted into the nut 420, the contact areas 80 of the pre-holding clip 100 abut with a support 440 other than the screw 420.

Advantageously, the fact that threads of the screw 200 remain untouched by the clip during introduction thereof allows having an excellent engagement with the nut 420.

Advantageously, this allows countering the "lock nut" phenomenon related to the surface 20. Indeed, if a direct contact between the plastic component and the nut occurs during fastening, an automaton fault might happen because of the excessive screwing torque.

LIST OF THE REFERENCE SIGNS

TABLE 1

| References | Designations |
|---|---|
| 100 | Clip/Fastening device/Sleeve |
| 20 | Body |
| 40 | Spring element/V-like shaped leaf spring |

TABLE 1-continued

| References | Designations |
|---|---|
| 42, 44 | Fastening point |
| 50 | Opening |
| 60 | Protrusion |
| 80 | Contact area |
| 200 | Threaded screw |
| 300 | Spacer |
| 320 | Hole |
| 340 | Reduced portion/Stop |
| 400 | Vehicle structure/sheet metal |
| 420 | Nut |
| 440 | Sheet metal interface |

What is claimed is:

1. A pre-holding clip, in the form of a sleeve, including a substantially cylindrical tubular body having an opening along its axis, characterised in that the clip includes at least one spring element over the external surface of the body, the spring element projecting out of the external surface of the body, the two ends of the spring element being secured to the body, and being able to be deformed towards the axis of the body; and the clip further includes at least one protrusion over the internal surface of the body, said at least one protrusion could be threaded when a tapped rod with an external diameter of the tapping larger than the internal diameter of the opening is introduced by screwing into the opening.

2. The pre-holding clip according to claim 1, including three spring elements distributed at an equal distance over the external surface of the body.

3. The pre-holding clip according to claim 1, wherein said at least one spring element is a V-like shaped leaf spring.

4. The pre-holding clip according to claim 1, including a plurality of protrusions over the internal surface of the body.

5. A fastening element, including a screw including a head and a tapped rod with a tapping; and a pre-holding clip, in the form of a sleeve, including a substantially cylindrical tubular body having an opening along its axis, characterised in that the clip includes at least one spring element over the external surface of the body, the spring element projecting out of the external surface of the body, the two ends of the spring element being secured to the body, and being able to be deformed towards the axis of the body; and the clip further includes at least one protrusion over the internal surface of the body, said at least one protrusion could be threaded when the tapped rod with an external diameter of the tapping larger than the internal diameter of the opening is introduced by screwing into the opening.

6. The fastening element according to claim 5, wherein the pre-holding clip includes three spring elements distributed at an equal distance over the external surface of the body.

7. The fastening element according to claim 5, wherein said at least one spring element is a V-like shaped leaf spring.

8. The fastening element according to one of claim 5, the clip includes a plurality of protrusions over the internal surface of the body.

9. A pre-mounted set, including a part including a hole, the internal diameter of the hole in a first end being smaller than the general internal diameter of the hole, a screw including a head and a tapped rod with a tapping; and a pre-holding clip, in the form of a sleeve, including a substantially cylindrical tubular body having an opening along its axis, characterised in that the clip includes at least one spring element over the external surface of the body, the spring element projecting out of the external surface of the body, the two ends of the spring element being secured to the body, and being able to be deformed towards the axis of the body; and the clip further includes at least one protrusion over the internal surface of the body, said at least one protrusion could be threaded when the tapped rod with an external diameter of the tapping larger than the internal diameter of the opening is introduced by screwing into the opening.

10. The pre-mounted set according to claim 9, wherein, said at least one spring element is deformed towards the axis of the body when the pre-holding clip with the screw introduced is mounted into the hole by the first end.

11. The pre-mounted set according to claim 9, wherein the clip includes three spring elements distributed at an equal distance over the external surface of the body.

12. The pre-mounted set according to claim 9, wherein said at least one spring element is a V-like shaped leaf spring.

13. The pre-mounted set according to claim 9, the pre-holding clip includes a plurality of protrusions over the internal surface of the body.

* * * * *